United States Patent
Tu et al.

(12) 
(10) Patent No.: US 7,361,695 B2
(45) Date of Patent: *Apr. 22, 2008

(54) PROCESS TO MANUFACTURE FLEXIBLE POLYURETHANE FOAMS

(75) Inventors: Johnson Tu, Taipei (CN); Lance A. Cooper, Lake Jackson, TX (US); Francois M. Casati, Pfäffikon (CH); Jean-Marie L. Sooney, Gingins (CH)

(73) Assignee: Dow Global Technologies Inc., Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/486,776

(22) PCT Filed: Aug. 15, 2002

(86) PCT No.: PCT/US02/26222

§ 371 (c)(1),
(2), (4) Date: Jul. 12, 2004

(87) PCT Pub. No.: WO03/016372

PCT Pub. Date: Feb. 27, 2003

(65) Prior Publication Data

US 2004/0242718 A1 Dec. 2, 2004

(51) Int. Cl.
*C08G 18/28* (2006.01)
(52) U.S. Cl. ............ 521/128; 521/129; 521/164; 521/167; 521/170; 521/174
(58) Field of Classification Search ............ 521/128, 521/129, 164, 167, 170, 174
See application file for complete search history.

(56) References Cited

U.S. PATENT DOCUMENTS

| | | | |
|---|---|---|---|
| 3,838,076 A | 9/1974 | Moss et al. | |
| 4,122,038 A | 10/1978 | Sandner et al. | |
| 4,517,313 A | 5/1985 | Nakatani | |
| 4,530,941 A * | 7/1985 | Turner et al. | 521/176 |
| 4,644,017 A | 2/1987 | Haas et al. | |
| 4,877,879 A * | 10/1989 | Gansow | 544/402 |
| 4,963,399 A | 10/1990 | Gill | |
| 5,476,969 A | 12/1995 | Hinz et al. | |
| 5,620,710 A | 4/1997 | Fiorentini et al. | |
| 5,672,636 A | 9/1997 | Horn et al. | |
| 5,693,703 A * | 12/1997 | Hart | 524/502 |
| 5,874,485 A * | 2/1999 | Milliren et al. | 521/160 |
| 6,586,485 B1 | 7/2003 | Bruchmann et al. | |
| 6,762,274 B2 * | 7/2004 | Waddington et al. | 528/78 |
| 6,924,321 B2 * | 8/2005 | Casati et al. | 521/167 |

FOREIGN PATENT DOCUMENTS

| | | | |
|---|---|---|---|
| DE | 235878 | | 4/1994 |
| EP | 0488219 | | 12/1997 |
| EP | 0747407 | | 2/1999 |
| WO | WO94/02525 | | 2/1994 |
| WO | WO 01/58976 | * | 8/2001 |

* cited by examiner

*Primary Examiner*—John M. Cooney, Jr.

(57) ABSTRACT

The present invention is to the production of flexible polyurethane foam in the absence of an amine catalyst. The reactivity of the foam forming system can be controlled by the addition of an autocatalytic polyol containing a tertiary amine where the amount of autocatalytic polyol comprises less than 5 percent by weight of the total polyol.

4 Claims, No Drawings

PROCESS TO MANUFACTURE FLEXIBLE POLYURETHANE FOAMS

The present invention pertains to a process to adjust system reactivity when manufacturing flexible foam with a reduced level or absence of amine catalyst.

Flexible foam is based on the polymerization of polyether and/or polyester polyols with isocyanates in the presence of water acting as blowing agent. These systems generally contain additional components such as cross-linkers, chain extenders, surfactants, cell regulators, stabilizers, antioxidants, flame retardant additives, fillers, and typically catalysts such as tertiary amines and organometallic salts. Levels of the catalysts in the polyurethane formulation are adjusted during the foam manufacturing process to produce the appropriate block shape in the case of square block production with Maxfoam or Hennecke-Planibloc equipments (see Polyurethane Handbook by G. Oertel, Hanser publisher, 1993, pages 182, 183, 195, and 196) and to optimize final foam properties such as cell structure, density, hardness, resiliency, airflow, elongation, tear resistance and aging characteristics.

The commonly used tertiary amine catalysts give rise to several problems, particularly in flexible, semi-rigid and rigid foam applications. Freshly prepared foams using these catalysts often have the typical odor of the amines and give rise to increased fogging such as emission of volatile products.

The presence, or formation, of tertiary amine catalyst vapors in polyurethane products are detrimental to vinyl films or polycarbonate sheets exposed thereto. Specifically, the tertiary amine catalysts present in polyurethane foams have been linked to the staining of the vinyl film and degradation of polycarbonate sheets. Theses PVC staining and polycarbonate decomposition problems are especially prevalent in environments wherein elevated temperatures exist for long periods of time, such as in automobile interiors.

Various solutions to this problem have been proposed. For instance, U.S. Pat. No. 4,517,313 discloses the use of the reaction product of dimethylaminopropylamine and carbonic acid as a catalyst for use in the manufacture of polyurethane. The use of this catalyst is stated to reduce odor and vinyl staining relative to the use of standard triethylenediamine catalysts. However this amine catalyst, which is a much weaker catalyst, cannot match the performance of a standard catalyst such as triethylenediamine in polyurethane curing. EP 176,013 discloses the use of specific aminoalkylurea catalysts in the manufacture of polyurethanes. Use of these high molecular weight catalysts is disclosed as reducing odor and vinyl staining. Due to their high molecular weight, these amine catalysts are unable to readily migrate through a polyurethane foam and thus their propensity to produce odors and stain vinyl films is reduced. However, when subjected to elevated temperatures as are commonly encountered in automobile interiors, these compounds may migrate within a foam.

Use of amine catalysts which contain a hydrogen isocyanate reactive group, such as a hydroxyl or a primary and/or a secondary amine, is proposed by catalyst suppliers. Such compounds are disclosed in EP 747,407 and in U.S. Pat. No. 4,122,038. A reported advantage of the catalyst composition is they are incorporated into the polyurethane product. However, to get acceptable processing conditions, those catalysts usually need to be used at high levels in the polyurethane formulation to compensate for their lack of mobility during the reactions. In addition, these catalysts lose activity once they have reacted with isocyanates.

Pre-polymerization of reactive amine catalysts with a polyisocyanate and a polyol is reported in PCT WO 94/02525. These isocyanate-modified amines show comparable or enhanced catalytic activity compared with the corresponding non-modified amine catalysts. However, the process overall gives handling difficulties such as gel formation and poor storage stability.

Specific crosslinkers are proposed in U.S. Pat. No. 4,963,399 to produce polyurethane foams that exhibit a reduced tendency to stain vinyl films. These crosslinkers cannot be used at levels sufficient to get the desired catalytic activity for foaming. Due to too rapid gelling, these catalysts negatively affect foam processing and foam properties, such as tear strength and elongation at break, are detrimentally affected due to a high level of crosslinking. Such disadvantages are also present for long chain tertiary aminoalcohol crosslinkers as disclosed in EP 488,219.

Modification of polyols by partial amination is disclosed in U.S. Pat. No. 3,838,076. While this modification gives additional reactivity to the polyol, this modification does not allow for adjustment of processing conditions since the aminated functions are rapidly tied up in the polymer by reaction with the isocyanate. Hence these aminated polyols give fast initiation of the foaming reaction but subsequently loose most of their catalytic activity and do not provide proper final curing.

Use of specific amine-initiated polyols where the tertiary amine is spatially separated from the reactive hydrogens is disclosed in U.S. Pat. No. 5,476,969. Polyols produced from initiators N,N'-bis(3-aminopropyl)ethylenediamine, tripropylenetetramine and tetrapropylenepentamine is disclosed in U.S. Pat. No. 5,672,636. The application in both documents was mainly directed to the production of semi-rigid and rigid polyurethane foams. Neither document discloses adjusting foam reactivity to meet processing conditions, such as continuous square block process, or to optimize foam physical properties.

Therefore, there continues to be a need to reduce or eliminate amine catalysts in production of polyurethane flexible foam while maintaining adjustable control over the catalyzed reaction.

It is an object of the present invention to produce polyurethane flexible foam with a reduction or elimination of conventional and/or reactive tertiary amine catalyst. With a reduction or elimination of amine catalysts, the disadvantages associated with such products as given above can be reduced.

It is a further object of the present invention to provide a process to manufacture flexible foam with low levels of autocatalytic polyol(s), i.e. polyols having catalytic activity able to replace amine catalysts, whereby the manufacturing process is not adversely affected and may even be improved by the reduction or elimination of amine catalysts.

It is a further object of the present invention to provide a process to adjust reactivity of a flexible foam system without relying on amine catalyst.

In another aspect, the process of the present invention using the autocatalytic polyol reduces the level of amine catalysts to which workers would be exposed in a flexible foam manufacturing plant.

The present invention is a process to adjust catalytic activity during a foaming process in the production of a flexible polyurethane foam by use of an autocatalytic polyol in a reaction mixture of (a) at least one organic polyisocyanate with (b) a polyol composition comprising (b1) more than 95 percent and up to 99 percent by weight of a polyol compound having a functionality of 2 to 8 and a hydroxyl number of from 20 to 800 and (b2) less than 5 percent percent down to 1 percent by weight of at least one autocatalytic polyol compound having a functionality of 1 to 8 and a hydroxyl number of from 15 to 200, wherein the reactivity of the mixture is adjusted by varying the ratio of (b1) to (b2); the weight percent is based on the total amount of polyol component (b), and (b2) is a polyol containing at least one tertiary amine group, polyol (b2) being an amine initiated polyol obtained either by alkoxylation of at least one initiator molecule of (b2a), (b2b), (b2c), (b2d), (b2e), (b2f), (b2g) or (b2h) wherein
(b2a) is

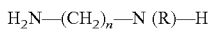
$$H_2N-(CH_2)_n-N(R)-H \quad \text{Formula (I)}$$

where n is an integer from 2 to 12, and
R is a $C_1$ to $C_3$ alkyl group;
(b2b) is a compound which contains a dialkylylamino group pendant to a polyhydroxy or polyamino molecule of Formula II

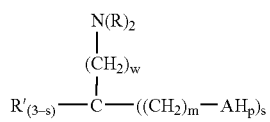

(Formula II)

where is R is as previously defined;
R' at each occurrence is a C1 to C3 alkyl group;
s is an integer from 1 to 3;
m is an integer from 1 to 12
A is nitrogen or oxygen;
p is 2 when A is nitrogen and is 1 when A is oxygen; and
w is 0, 1, or 2;
(b2c) is a dimethylamino group pendant to a monohydroxy or monamino structure of Formula III

$$R^2-(CH_2)_y-CH_{(2-x)}R_x-AH_p \quad \text{(Formula III)}$$

where $R^2$ is $NR'_2$ or a 5 substituted, 1-aza-3,7-dioxabicyclo [3.3.0] octane;
R, R', A, and p, are as previously defined;
y is 0 to 12; and
x is 0, 1 or 2;
(b2d) is a bis-N-substituted piperazine wherein the substitution is amino- or hydroxy-substituted C1 to C6 linear or branched alkyl;
(b2e) is a compound of Formula IV

$$R^3-NH-R \quad \text{(Formula IV)}$$

where $R^3$ a C5 to C6 cycloalkyl group and R is as previously defined;
(b2f) is a compound of Formula V

$$H_pB-(CH_2)_n-N(R)-(CH2)_n-BH_p \quad \text{(Formula V)}$$

where n at each occurrence is independently an integer from 2 to 12,
B at each occurrence is independently oxygen, nitrogen or hydrogen, with the proviso that only one of B can be hydrogen at one time,
R is a C1 to C3 alkyl group
p is equal to 0 when B is hydrogen, is 1 when B is oxygen and is 2 when B is nitrogen
(b2g) is a compound of Formula VI

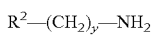
$$R^2-(CH_2)_y-NH_2 \quad \text{(Formula VI)}$$

where $R^2$ and y are as previously defined;

(b2h) is one molecule of Formula VII

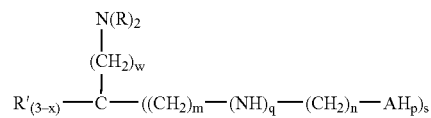

(Formula VII)

where R' at each occurrence is independently a $C_1$ to $C_3$ alkyl group;
R, s and w are as previously defined;
x is an integer from 0 to 2;
m and n are independently integers from 1 to 12;
q is an integer from 1 to 3;
A is nitrogen or oxygen;
p is 2 when A is nitrogen and is 1 when A is oxygen;
or (b2) is (b2i) a compound which contains an alkyl amine within the polyol chain or a di-alkyl amino group pendant to the polyol chain wherein the polyol chain is obtained by copolymerization of at least one monomer containing an alkylaziridine or N,N-dialkyl glycidylamine with at least one alkylene oxide, wherein the alkyl or di-alkyl moiety of the amine is a C1 to C3 alkyl;
or (b2) is a hydroxyl-tipped prepolymer obtained from the reaction of an excess of (b2a), (b2b), (b2c), (b2d), (b2e), (b2f), (b2g), (b2h) or (b2i) with a polyisocyanate;
or (b2) is (b2j) a blend selected from (b2a), (b2b) (b2c), (b2d), (b2e), (b2f), (b2g), (b2h) (b2I) or hydroxyl-terminated prepolymers obtained from polyols based on initiators (b2a)-(b2h);
(c) in the presence of a blowing agent; and
(d) optionally additives or auxiliary agents known per se for the production of flexible polyurethane foam.

In another embodiment, the present invention is a process as disclosed above wherein the polyisocyanate (a) contains at least one polyisocyanate that is a reaction product of a excess of polyisocyanate with a polyol as defined by (b2a), (b2b), (b2c), (b2d), (b2e), (b2f), (b2g), (b2h) (b2i) above, or a mixture thereof.

In a further embodiment, the present invention is a process as disclosed above where the polyol (b)contains a polyol-terminated prepolymer obtained by the reaction of an excess of polyol with a polyisocyanate wherein the polyol is a polyol as defined by (b2a), (b2b), (b2c), (b2d), (b2e), (b2f), (b2g), (b2h) (b2i) above, or a mixture thereof.

The polyols containing bonded tertiary amine groups as disclosed in the present invention are catalytically active and accelerate the addition reaction of organic polyisocyanates with polyhydroxyl or polyamino compounds and the reaction between the isocyanate and the blowing agent such as water or a carboxylic acid or its salts. The addition of these polyols to a polyurethane reaction mixture reduces and even eliminates the need to include a conventional tertiary amine catalyst within the mixture while reactivity adjustments capabilities are maintained.

In accordance with the present invention, a process for the production of flexible polyurethane foam is provided, whereby polyurethane products without amine catalyst are produced while keeping the versatility of reactivity adjustments. Furthermore, the polyurethane foams produced in accordance with the invention exhibit a reduced tendency to stain vinyl films or to degrade polycarbonate sheets with which they are exposed, have a reduced tendency to produce 'blue haze' vision which is associated with the use of certain tertiary amine catalysts, are more environmental friendly through the elimination of amine catalysts. These advantages are achieved by including in the reaction mixture either a low level of a polyol (b2) or by using such low levels of polyol (b2) in a prepolymer with a polyisocyanate alone or with an isocyanate and a second polyol.

The combination of polyols used in the present invention will be a combination of (b1) and low level of (b2) as described above. As used herein the term polyols are those materials having at least one group containing an active hydrogen atom capable of undergoing reaction with an isocyanate. Preferred among such compounds are materials having at least two hydroxyls, primary or secondary, or at least two amines, primary or secondary, carboxylic acid, or thiol groups per molecule. Compounds having at least two hydroxyl groups per molecule are especially preferred due to their desirable reactivity with polyisocyanates.

Suitable polyols (b1) that can be used to produce polyurethane materials with the autocatalytic polyols (b2) of the present invention are well known in the art and include those described herein and any other commercially available polyol and/or SAN, PIPA or PHD copolymer polyols. Such polyols are described in Polyurethane handbook, by G. Oertel, Hanser publishers. Mixtures of one or more polyols and/or one or more copolymer polyols may also be used to produce polyurethane foams according to the present invention.

Representative polyols include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491, the disclosure of which is incorporated herein by reference. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator having from 2 to 8, preferably 2 to 6 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate or BF3 or phosphazenium catalysts as described in EP 897,940.

The polyol or blends thereof employed depends upon the end use of the polyurethane product to be produced. The molecular weight or hydroxyl number of the base polyol may thus be selected so as to result in low density or high density, conventional or high resilient, hot molding or cold molding, flexible foam when the polymer/polyol produced from the base polyol is converted to a polyurethane product by reaction with an isocyanate in the presence of a blowing agent. The hydroxyl number and molecular weight of the polyol or polyols employed can vary accordingly over a wide range. In general, the hydroxyl number of the polyols employed may range from 15 to 800.

In the production of a flexible polyurethane foam, the polyol is preferably a polyether polyol and/or a polyester polyol. The polyol generally has an average functionality ranging from 2 to 5, preferably 2 to 4, and an average hydroxyl number ranging from 20 to 100 mg KOH/g, preferably from 20 to 70 mgKOH/g. As a further refinement, the specific foam application will likewise influence the choice of base polyol. As an example, for molded foam, the hydroxyl number of the base polyol may be on the order of 20 to 60 with ethylene oxide (EO) capping, and for slabstock foams the hydroxyl number may be on the order of 25 to 75 and is either mixed feed EO/PO (propylene oxide) or is only slightly capped with EO.

The initiators for the production of polyols (b1) generally have 2 to 8 functional groups that will react with the polyol. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof. Other initiators include compounds linear and cyclic compounds containing a tertiary amine such as ethanoldiamine, triethanoldiamine, and various isomers of toluene diamine.

The autocatalytic polyols (b2) are those containing at least one tertiary nitrogen, such as the ones initiated with an alkyl amine as described by (b2a), (b2b), (b2c), (b2d), (b2e), (b2f) (b2g) or (b2h) or those containing an alkylamine as part of the polyol chain as described by (b2i).

The properties of the autocatalytic polyols can vary widely as described above for polyol (b1) and such parameters as average molecular weight, hydroxyl number, functionality, etc. will generally be selected based on the end use application of the formulation, that is, what type of flexible polyurethane foam. Selection of a polyol with the appropriate hydroxyl number, level of ethylene oxide, propylene oxide and butylene oxide, mixed feed, capping, functionality and equivalent weight are standard procedures known to those skilled in the art. For example, polyols with a high level of ethylene oxide will be hydrophilic, while polyols with a high amount of propylene oxide or butylene oxide will be more hydrophobic. The equivalent weight of polyol (b2) will be sufficient to provide a foam with good flexibility and resiliency. Viscoelastic foams can also be produced with the present invention.

The production of polyols containing the compounds (b2a), (b2b), (b2c,) (b2d), (b2e), (b2f), (b2g) or (b2h) as an initiator can be done by procedures well known in the art as disclosed for (b1). In general, a polyol (b2) is made by the addition of an alkylene oxide (EO, PO, or BO), or a combination of alkylene oxides to the initiator. Catalysis for this polymerization can be either anionic or cationic with catalysts such as KOH, CsOH, boron trifluoride, or a double cyanide complex (DMC) catalyst such as zinc hexacyanocobaltate, or phosphazenium catalysts as described in EP 0 897 940. For some applications only one alkylene oxide monomer is used, for other applications a blend of monomers is used and in some cases a sequential addition of monomers is preferred, such as PO followed by an EO feed, EO followed by PO, etc. Processing conditions such as reactor temperature and pressure, feeding rates and catalyst level are adjusted to optimize production yield. Of particular importance is the polyol unsaturation which is below 0.1 meq/g and the low color of the polyol.

Polyester polyols can be prepared by the reaction of (b2) with a diacid. These can be used in combination with conventional polyester polyols as used today in slabstock foams.

The limitations described with respect to the characteristics of the polyols (b1) and (b2) above are not intended to be restrictive but are merely illustrative of the large number of possible combinations for the polyol or polyols used.

In one embodiment of Formula I, R is methyl. Preferably n in Formula I is an integer of 2 to 4. In a preferred embodiment, R is methyl and n is an integer of 2 to 4.

Compounds of Formula I can be made by standard procedures known in the art. Examples of commercially available compounds of Formula I include N-methyl-1,2-ethanediamine and N-methyl-1,3-propanediamine.

In one embodiment of Formula II, R is methyl. Preferably R' at each occurrence of Formula II is an alkyl group with the same number of carbon atoms. Products of formula II are made using standard procedures known in the art or are commercially available. For example, N,N-dimethyl-tris (hydroxymethyl)aminomethane can be made by methylation of tris-amino, or tris(hydroxymethyl)aminomethane; an aminoalcohol commercially available from ANGUS Chemical.

Similarly for compounds of Formula III, R is preferably methyl and R' at each occurrence is an alkyl with the same number of carbon atoms. Representative examples of (b2c) include dimethylaminoethanolamine, hydroxymethyl oxazolidine.

Example compounds of (b2d) are diamino or dihydroxy derivatives of piperazine such as N-bis(2-amino-isobutyl)-piperazine. Compounds of (b2d) are commercially available or can be made by standard procedures known in the art.

A representative example of (b2e) and Formula IV is N-methyl-cyclohexylamine.

Example compounds of (b2f) include 3,3'-diamino-N-methyldipropylamine; 2,2'-diamino-N-methyldiethylamine; 2,3-diamino-N-methyl-ethyl-propylamine; 3,3'-diamino-N-methyldipropylamine.

Example compound of (b2g) is N,N-dimethylaminopropylamine (or DMAPA).

Representative compounds of Formula VII (b2h) are disclosed in U.S. Pat. No. 5,476,969, the disclosure of which is incorporated herein by reference. Preferred compounds of Formula VII are when x is 0 or 2; s is 3 or 1; m is less than 6; q is 1 and A is Nitrogen.

The weight ratio of (b1) to (b2) will vary depending on the system reactivity and to the reaction profile required by the specific application to produce square blocks and to optimize processing conditions and final foam characteristics. The addition of (b2) reduces and even eliminates the need to use any amine catalyst. Reactivity may be adjusted 'on the fly', that is without stopping the machine and by varying respective polyol pump outputs, in the case of slabstock foam, or for each mold pouring, in the case of molding, by increasing or decreasing the concentration of (b2) in relation to (b1) again through proper pump output adjustments. Thus while the total (b) is adjusted to the size of the bun or to the density of the molded part to produce in relation with the level of water and other blowing agents, temperature of the raw materials, atmospheric pressure or any other parameter influencing these flexible foam production processes as known by persons skilled in the art, the level of (b2) can be adjusted, reduced or increased, to meet the change in process conditions, especially when producing square blocks or when using the frothing and/or reduced pressure process described in U.S. Pat. No. 5,194,453, and to optimize foam physical characteristics.

Surprisingly it has been found that in the production of flexible foam, particularly the continuous production of slabstock foam, the conventional amine catalyst can be replaced by a low level of high equivalent weight (b2) polyol. By a low level means less than 5 percent by weight of the total polyol, and preferably less than 4 percent by weight of the total polyol. The continuous production of flexible foam is known in the art, see for example, U.S. Pat. Nos. 3,325,823 and 4,492,664 and Polyurethane Handbook by G. Oertel.

Combination of two or more autocatalytic polyols of (b2) type can also be used with satisfactory results in a single polyurethane formulation when one wants for instance to adjust blowing and gelling reactions modifying the two polyol structures with different functionalities, equivalent weights, ratio EO/PO etc, and their respective amounts in the formulations.

Acid neutralization of the polyol (b2) can also be considered when for instance delayed action is required. Acids used can be carboxylic acids such as formic acid, acetic acid, salicylic acid, acrylic acid, 2-chloropropionic acid, an amino acid or a non-organic acid such as sulfuric or phosphoric acid.

Polyols pre-reacted with polyisocyanates and polyol (b2) with no free isocyanate functions can also be used in the polyurethane formulation. Isocyanate prepolymers based on polyol (b2) can be prepared with standard equipment, using conventional methods, such a heating the polyol (b2) in a reactor and adding slowly the isocyanate under stirring and then adding eventually a second polyol, or by prereacting a first polyol with a diisocyanate and then adding polyol (b2).

The isocyanates which may be used with the autocatalytic polyols of the present invention include aliphatic, cycloaliphatic, arylaliphatic and aromatic isocyanates. Aromatic isocyanates, especially aromatic polyisocyanates are preferred.

Examples of suitable aromatic isocyanates include the 4,4'-, 2,4' and 2,2'-isomers of diphenylmethane diisocyante (MDI), blends thereof and polymeric and monomeric MDI blends toluene-2,4- and 2,6-diisocyanates (TDI), biuret modified TDI's, polymerized isocyanates, m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. MDI or TDI based prepolymers can also be used, made either with polyol (b1), polyol (b2) or any other polyol as described heretofore. Isocyanate-terminated prepolymers are prepared by reacting an excess of polyisocyanate with polyols, including aminated polyols or imines/enamines thereof, or polyamines.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

For flexible polyurethane foams, water is preferred as a blowing agent. The amount of water is preferably in the range of from 0.5 to 10 parts by weight, more preferably from 2 to 7 parts by weight based on 100 parts by weight of the polyol. Carboxylic acids or salts are also used as blowing agents and polyols such as (b2) are especially effective for this application.

Use of carbon dioxide, either as a gas or as a liquid, as auxiliary blowing agent, in addition to water, is especially of interest with polyols (b2) as well as use of methylal or dimethoxymethane by itself or in combination with carbon dioxide, and use of dimethylcarbonate. Use of adjusted atmospheric pressure and/or frothing, as described in U.S.

Pat. No. 5,194,453 to vary foam density and comfort, can also be contemplated with the present invention.

In addition to the foregoing critical components, it is often desirable to employ certain other ingredients in preparing polyurethane polymers. Among these additional ingredients are surfactants, preservatives, flame retardants, colorants, antioxidants, reinforcing agents, stabilizers and fillers.

In making polyurethane foam, it is generally preferred to employ an amount of a surfactant to stabilize the foaming reaction mixture until it cures. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 3 parts of the surfactant per 100 parts by weight total polyol (b) are sufficient for this purpose.

One or more organometallic catalysts for the reaction of the polyol with the polyisocyanate can be used. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. The reduced amount of amine catalysts, such as dimethylethanolamine, triethylenediamine or bis(dimethylaminoethyl)ether can vary from 0.02 to 5 percent in the formulation and organometallic catalysts from 0.001 to 1 percent in the formulation can be used.

A crosslinking agent or a chain extender may be added, if necessary. The crosslinking agent or the chain extender includes low-molecular polyhydric alcohols such as ethylene glycol, diethylene glycol, 1,4-butanediol, and glycerin; low-molecular amine polyol such as diethanolamine and triethanolamine; polyamines such as ethylene diamine, xlylenediamine, and methylene-bis(o-chloroaniline). The use of such crosslinking agents or chain extenders is known in the art as disclosed in U.S. Pat. Nos. 4,863,979 and 4,963,399 and EP 549,120, the disclosure of which are incorporated herein by reference.

The applications for foams produced by the present invention are those known in the industry. Flexible foams find use in applications such as vehicle parts, such as seats, armrests, dashboards or instrument panels, sun visors, door linings, noise insulation parts either under the carpet or in other parts of the car interior or in the engine compartment, as well as in many domestic applications such as shoe soles, cloth interliners, appliance, furniture and bedding.

Processing for producing polyurethane products are well known in the art. In general components of the polyurethane-forming reaction mixture may be mixed together in any convenient manner, for example by using any of the mixing equipment described in the prior art for the purpose such as described in Polyurethane Handbook, by G. Oertel, Hanser publisher.

The polyurethane products are either produced continuously or discontinuously, by injection, pouring, spraying, casting, calendering, etc; these are made under free rise or molded conditions, at atmospheric pressure, reduced or increased air pressure, with or without release agents, in-mold coating, or any inserts or skin put in the mold. Flexible molded foams can be mono- or dual-hardness.

The following examples are given to illustrate the invention and should not be interpreted as limiting in anyway. Unless stated otherwise, all parts and percentages are given by weight.

A description of the raw materials used in the examples is as follows.

Dabco DC 5160 is a silicone-based surfactant available from Air Products and Chemicals Inc Tegostab B2370 is a silicone based surfactant available from Goldschmidt AG Dabco BLV is a tertiary amine catalyst blend of Dabco BL11 (bis(dimethylaminoethyl)ether and Dabco 33LV (triethylenediamine) available from Air Products and Chemicals, Inc.

Dabco T-9 is Stannous Octoate catalyst, available from Air Products and Chemicals, Inc.

VORANOL 3137A is a glycerol initiated mixed polyoxypropylene polyoxyethylene polyol having an average hydroxyl number of 56 available from The Dow Chemical Company.

Voranol 3040 is a polyol similar to 3137 having an average hydroxyl number of 57 Available from The Dow Chemical Company VORANATE T-80 is TDI 80/20 available from The Dow Chemical Company.

Polyol A is a triol initiated with N-methyl-1,3-propylenediamine similar in composition to Voranol 3137A Polyol B is a 1,700 EW propoxylated tetrol with 15 percent EO capping initiated with 3,3'-diamino-N-methyldipropylamine.

Polyol C is a 1,000 EW propoxylated diol with 15 percent EO capping initiated with DMAPA.

All foams were made in the laboratory by box foaming according to the following procedure: preblending 600 grams polyols with surfactants, eventually catalysts and water, then mixing for 15 seconds at 1,800 RPM using a pin type mixer. The tin catalyst, dispensed by volume, was then added to the stirred components and mixed for an additional 15 seconds at 1,800 RPM. The required amount of TDI was then added to the cup and vigorously mixed for 3 seconds at 2,400 RPM. The cup contents were poured into a 15"× 15"10" wooden box lined with a polyethylene bag. The cream time, blow off, degree of foam settling and any distinct reaction characteristics are then recorded. The foam buns are allowed to cure overnight under a ventilated fume hood. They are then placed in ambient storage and six days after foaming are submitted to conditioning and foam testing according to ASTM D 3574-83 test methods.

EXAMPLES 1, 2 AND 3

Free rise flexible foams were made according to formulations 1, 2 and 3 based on polyols A and B of the invention and, for comparison, according to formulations C1 and C2, using conventional amine catalyst Dabco BLV. All formulations are in parts by weight. The results are shown in the Table 1.

TABLE 1

|  | 1 | C1* | 2 | C2* | 3 |
|---|---|---|---|---|---|
| Voranol 3137A | 97 | 100 | 97 | 100 | 97 |
| Polyol A | 3 | 0 |  |  |  |
| Polyol B |  |  | 3 |  |  |
| Dabco BLV | 0 | 0.12 |  | 0.12 |  |

TABLE 1-continued

|  | 1 | C1* | 2 | C2* | 3 |
|---|---|---|---|---|---|
| Dabco DC 5160 | 1.2 | 1.2 | 1.2 | 1.2 | 1.2 |
| Dabco T9 | 0.15 | 0.15 | 0.30 | 0.30 | 0.30 |
| Water | 6.5 | 6.5 | 6.5 | 6.5 | 6.5 |
| Voranate T-80 |  |  |  |  |  |
| Index | 115 | 115 | 104 | 104 | 104 |
| Cream Time (s) | 13 | 13 | 12 | 13 | 15 |
| Rise Time (s) | 89 | 90 | 68 | 72 | 72 |
| Free rise density kg/m³ | 17.2 | 17.1 | 16.4 | 16.6 | 16.7 |
| 25 percent IFD (N) | 212 | 201 | 198 | 203 | 204 |
| 65 percent IFD (N) | 398 | 381 | 359 | 372 | 374 |
| Airflow (cfm) | 3.5 | 4.5 | 0.52 | 0.53 | 0.53 |
| Resiliency (percent) | 32 | 21 | 26 | 25 | 26 |
| Tear strength kg/cm | 0.29 | 0.23 | 0.45 | 0.43 | 0.43 |
| Tensile Strength kg/cm² | 0.93 | 0.86 | 1.22 | 1.12 | 1.13 |
| Elongation at break percent | 71 | 67 | 127 | 123 | 133 |
| 90 percent Compression set ct percent | 11.0 | 8.7 | 6.0 | 3.9 | 6.3 |
| 90 percent Compression set cd percent | 12.2 | 9.7 | 6.6 | 4.4 | 7.0 |

*Not examples of the present invention.

Foams 1, 2 and 3 made with low levels of autocatalytic polyols A and B and no amine catalysts have reactivity and physical properties comparable to foams C1 and C2 based on conventional amine catalysts. In addition, it is surprising to see that the increase in Dabco T-9 did give the same airflow values with polyols A and B as with conventional catalyst Dabco BLV. It is known that the balance between amine and Tin catalysis is always critical, especially at such low foam densities, and that poor blowing (amine) catalysis will lead to processing difficulties and insufficient foam characteristics. Examples 1, 2 and 3 demonstrate the versatility of the present technology since these polyols have high equivalent weights.+

EXAMPLE 4

A foam 4 identical to foam 3, but with 95 parts by weight of Voranol 3137A and 5 parts of polyol B, had a cream time of 13 seconds and a rise time of 67 seconds with density 17 kg/m3 and other physical properties comparable to foam 3B. This confirms that reactivity is increased, as evidenced by a decrease in cream and rise times, when the level of polyol B is increased in the formulation, hence that reactivity profile can be adjusted by changing the level of polyol (b2) in the foam formulation.

EXAMPLE 5

Two free rise foams: formulation 5 based on polyol A and C3 (comparative), were produced with lower water levels than with examples 1, 2 and 3. The formulations and results are given in Table 2.

TABLE 2

|  | Formulation 5 | Formulation C3* |
|---|---|---|
| Voranol 3137A | 97 | 100 |
| Polyol A | 3 | 0 |
| Water | 3.7 | 3.7 |
| Dabco DC 5160 | 1.0 | 1.0 |
| Dabco BLV | 0 | 0.09 |
| Dabco T9 | 0.21 | 0.21 |
| Voranate T80 |  |  |
| Index | 110 | 110 |
| Cream time (s) | 14 | 13 |
| Rise time (s) | 111 | 116 |
| Blow off | Yes | Yes |
| Airflow (cfm) | 2.2 | 2.9 |
| Density (kg/m3) | 26.0 | 26.8 |
| 25 percent IFD (N) | 208 | 204 |
| Resiliency (percent) | 41 | 42 |
| Tear strength kg/cm | 0.39 | 0.30 |
| Tensile strength (kg/cm2) | 0.99 | 0.91 |
| Elongation at break (percent) | 116 | 106 |
| 90 percent Compression set cd 91 (percent) | 3.1 | 2.5 |

*foam not part of the invention

These examples confirm that the use of polyol A at low concentration in formulation 5 produces good flexible foam, comparable to the foam C3 made with conventional amine catalyst. Hence the technology can be applied to a full range of foam densities as needed by the industry.

EXAMPLE 6

Two foams 6 and C4, based on two different levels of polyol C, shows the influence on foam reactivity as presented in Table 3 below with Dabco T-9 at 0.18 parts, Tegostab B-2370 at 0.80 parts and water at 4.0 parts. No amine catalyst was added.

TABLE 3

| Example | 6 | C4 * |
|---|---|---|
| Voranol 3040 | 96 | 93 |
| Polyol C | 4 | 7 |
| T-80 index | 110 | 110 |
| Cream time (s) | 7 | 6 |
| Rise time (s) | 100 | 82 | comparative foam, not part of the invention
* Formulation C4 was too reactive and gave a foam with strong settle of 4 to 5 cm at the end of rise. Such settling leads to higher foam density and poorer cell structure.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for producing a polyurethane foam comprising the steps of:
providing at least one organic polyisocyanate;
providing a first polyol compound, wherein said polyol having a functionality in the range of 2 to 8 and a hydroxyl number in the range of 20 to 100;
providing an autocatalytic polyol compound having a functionality in the range of 2 to 8 and a hydroxyl number in the range of 15 to 200, wherein said autocatalytic polyol compound comprising at least one tertiary amine group, and said autocatalytic polyol being an amine initiated polyol obtained by alkoxylation of at least one initiator molecule selected from the group consisting of 3,3'-diamino-N-methyldipropylamine, 2,2'-diamino-N-methyldiethylamine, 2,3-diamino-N-methyl-ethyl-propylamine, 3,3'-diamino-N-methyldipropylamine or a mixture thereof;
continuously merging together said organic polyisocyanate, said first polyol, and said autocatalytic polyol compound in the presence of a blowing agent and optionally one or more additives;
optimizing the reaction conditions via adjusting the weight percent ratio of said autocatalytic polyol compound to said first polyol compound in a range of 1:99 weight percent to 5:95 weight percent, based on the total weight of said autocatalytic polyol compound and said first polyol compound; and
thereby producing a flexible polyurethane foam.

2. The process of claim 1 wherein the process is a continuous process for the production of slabstock foam.

3. The process according to claim 1, wherein the initiator for said first polyol compound being an organic dicarboxylic acid, a dihydric to octahydric alcohol, or dialkylene glycol.

4. The process according to claim 1, wherein said initiator molecule is 3,3'-diamino-N-methyldipropylamine.

* * * * *